United States Patent
Chen et al.

(10) Patent No.: US 8,982,257 B2
(45) Date of Patent: Mar. 17, 2015

(54) IMAGE SENSOR MODULE AND CAMERA MODULE USING SAME

(71) Applicant: Hon Hai Precision Industry Co., Ltd., New Taipei (TW)

(72) Inventors: Shin-Wen Chen, New Taipei (TW); Wen-Chang Chen, New Taipei (TW); Yu-Tsan Cheng, New Taipei (TW); Yu-Shu Lin, New Taipei (TW); Chien-Liang Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 25 days.

(21) Appl. No.: 13/727,475

(22) Filed: Dec. 26, 2012

(65) Prior Publication Data

US 2014/0055651 A1 Feb. 27, 2014

(30) Foreign Application Priority Data

Aug. 22, 2012 (TW) .............................. 101130373 A

(51) Int. Cl.
 *H04N 5/335* (2011.01)
 *H01L 23/06* (2006.01)
 *H04N 5/225* (2006.01)

(52) U.S. Cl.
 CPC ............ *H04N 5/335* (2013.01); *H04N 5/2257* (2013.01)

USPC .......................................... 348/294; 257/684

(58) Field of Classification Search
 CPC ...................................................... H04N 5/335
 USPC ................... 348/294, 340, 374; 257/684, 686
 See application file for complete search history.

(56) References Cited

U.S. PATENT DOCUMENTS

| 7,391,002 B2 * | 6/2008 | Sato et al. .................. 250/208.1 |
| 8,510,938 B2 * | 8/2013 | Yu et al. ........................... 29/844 |
| 8,711,277 B2 * | 4/2014 | Apel ............................. 348/360 |
| 2007/0146534 A1 * | 6/2007 | Kim et al. ...................... 348/340 |

* cited by examiner

*Primary Examiner* — Trung Diep
(74) *Attorney, Agent, or Firm* — Novak Druce Connolly Bove + Quigg LLP

(57) ABSTRACT

An image sensor module includes a ceramic substrate, an image sensor, a conductive film, a flexible print circuit board (FPCB), and a stiffening plate. The ceramic substrate includes an upper surface and a lower surface opposite to the upper surface, the ceramic substrate defines a transparent hole on the upper surface and a receiving recess on the lower surface. The transparent hole communicates with the receiving recess. The image sensor is received in the receiving recess and is electrically connected to the ceramic substrate. The FPCB is electrically connected to the lower surface of the ceramic substrate by the conductive film. The stiffening plate is positioned on one side of the FPCB opposite to the ceramic substrate.

7 Claims, 4 Drawing Sheets

IMAGE SENSOR MODULE AND CAMERA MODULE USING SAME

BACKGROUND

1. Technical Field

The present disclosure relates to optical modules, and particularly, to an image sensor module and a camera module including the image sensor module.

2. Description of Related Art

Image sensor modules generally include a ceramic substrate, an image sensor, and a flexible printed circuit board (FPCB). The image sensor is electrically connected on a lower surface of the ceramic substrate by flip-chip package. The ceramic substrate is positioned on the FPCB and electrically connected to the FPCB by conductive glue. However, the mechanical strength and the flatness of the FPCB are often less than satisfactory and, as a result, the ceramic substrate cannot be stably connected to the FPCB.

Therefore, it is desirable to provide an image sensor module and a camera module, which can overcome the limitations described.

DETAILED DESCRIPTION

Embodiments of the disclosure will be described with reference to the drawings.

Figure 1:
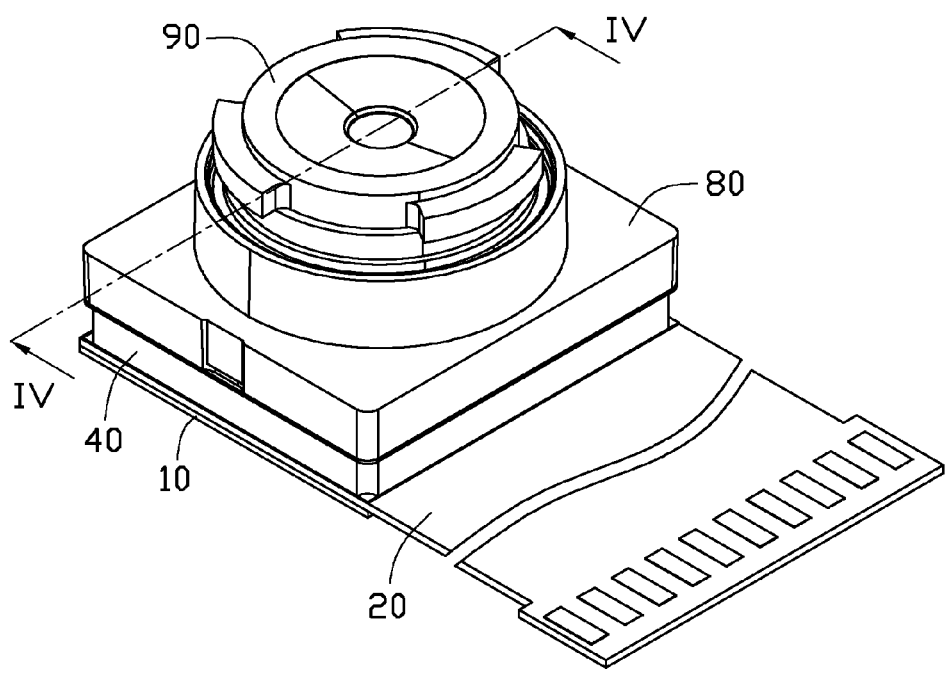
FIG. 1 is an isometric view of a camera module in accordance with an exemplary embodiment.
Figure 2:
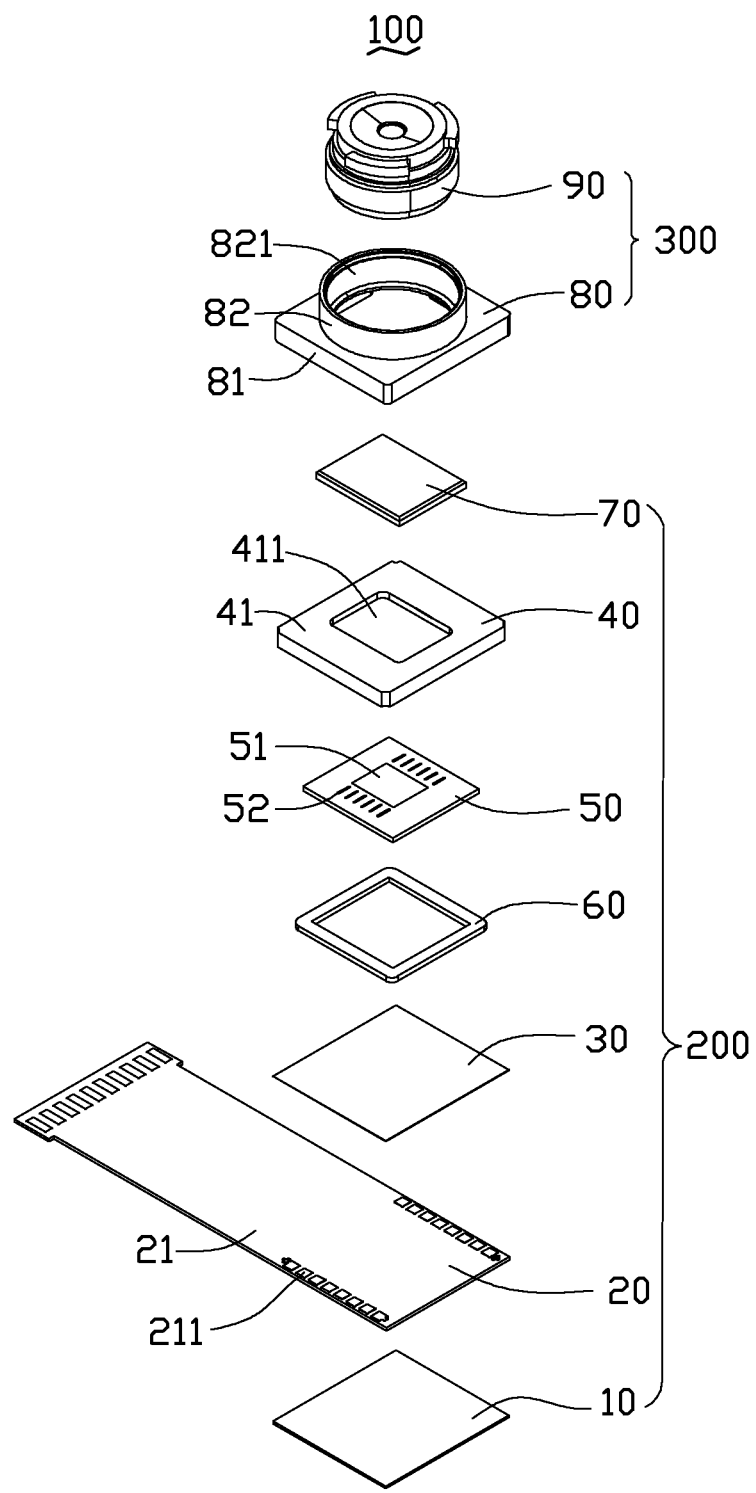
FIG. 2 is an isometric, exploded, and schematic view of the camera module of FIG. 1.
Figure 3:
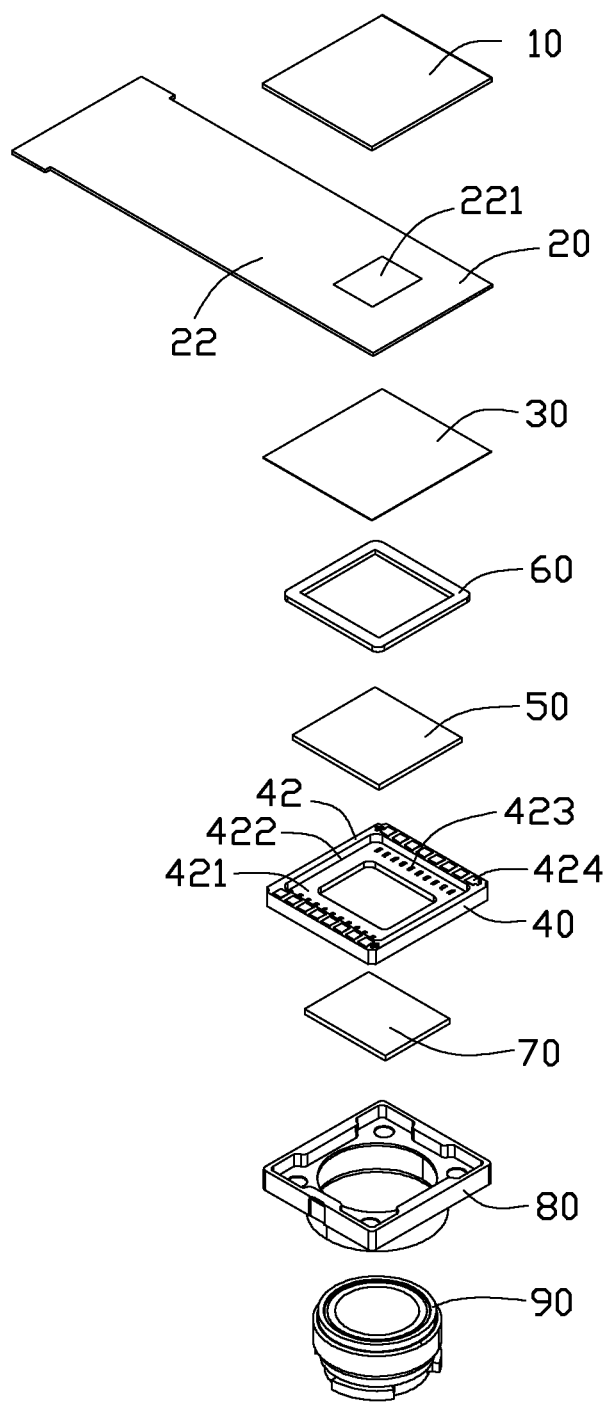
FIG. 3 is similar to FIG. 1, but viewed from another angle.

FIGS. 1-3 show a camera module 100 according to an exemplary embodiment. The camera module 100 includes an image sensor module 200 and a lens module 300 positioned on the image sensor module 200. The image sensor module 200 includes a stiffening plate 10, a flexible printed circuit board (FPCB) 20, a conductive film 30, a ceramic substrate 40, an image sensor 50, a filling body 60, and a filter 70. The lens module 300 includes a lens holder 80 and a lens unit 90.

The stiffening plate 10 is plate shaped, and is made of conductive material, such as copper (Cu) and aluminum (Al). The mechanical strength and the flatness of the stiffening plate 10 are excellent, as compared with the FPCB 20.

The FPCB 20 includes a first surface 21 and a second surface 22 opposite to the first surface 21. A number of connecting pads 211 are formed on the first surface 21 and generally adjacent to two opposite edges of the FPCB 20. A grounded pad 221 is formed on the second surface 22 and generally adjacent to one end of the FPCB 20. The stiffening plate 10 is positioned on the second surface 22 of the FPCB 20, and is electrically connected to the connecting pads 211.

The conductive film 30 is an anisotropic conductive film, and is adhered on the first surface 21 of the FPCB 20. The conductive film 20 is electrically connected along a direction perpendicular to the first surface 21 and is electrically disconnected along a direction parallel with the first surface 21 when the conductive film 30 is hot pressed.

The ceramic substrate 40 includes an upper surface 41 and a lower surface 42 opposite to the upper surface 41. The ceramic substrate 40 defines a transparent hole 411 on the upper surface 41 and a receiving recess 421 on the lower surface 42. The transparent hole 411 communicates with the receiving recess 421. The receiving recess 421 includes a connecting surface 422 parallel with the upper surface 41. A number of first pads 423 are formed on the connecting surface 422, and a number of second pads 424 are formed on the lower surface 42. The first pads 423 are correspondingly connected to the second pads 424 by wires buried in the ceramic substrate 40.

The image sensor 50 includes an image surface 51 and a number of pins 52 adjacent to two opposite edges of the image surface 51. The image sensor 50 is configured for converting light rays projected on the image surface 51 to image signals in form of electric signals, and the image signals are output from the pins 52. In the embodiment, the image sensor 50 can be a complementary metal-oxide-semiconductor transistor (CMOS) sensor or a charge coupled device (CCD) sensor.

The filling body 60 is a frame, and is made of black glue. The black glue is applied into to a mold and then is cured.

The filter 70 is rectangular, and is made of transparent materials, such as glass. The filter 70 is configured for filtering infrared light out from the light projected thereon.

Figure 4:
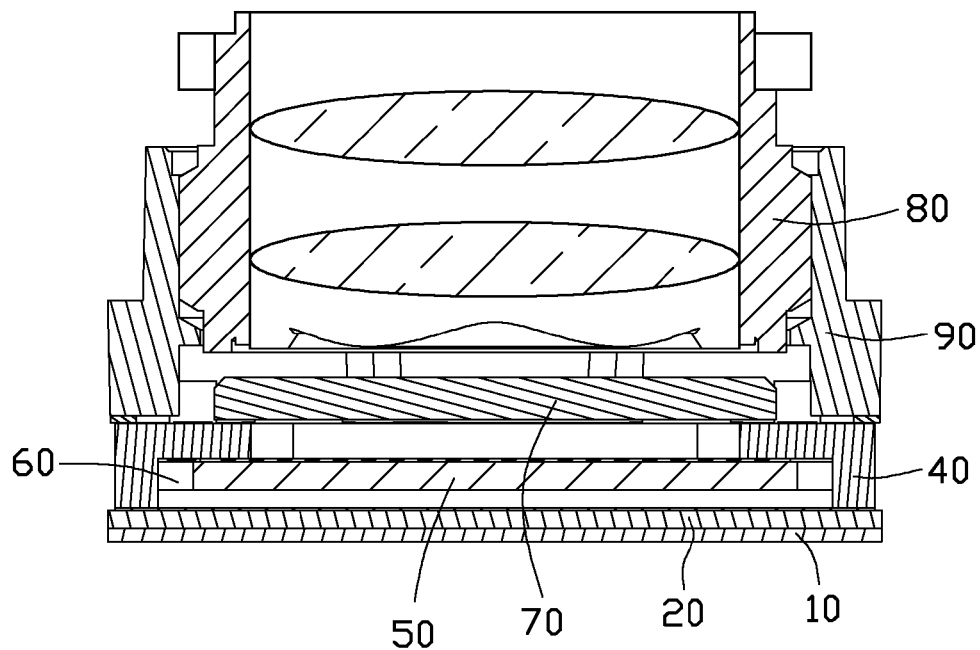
FIG. 4 is a cross-sectional view taken along a line IV-IV of FIG. 1.

FIG. 4 shows an assembling process of the image sensor module 200. The image sensor 50 is received in the receiving recess 421, and the image surface 51 faces the transparent hole 411. The pins 52 are electrically connected to the first pads 423. The filling body 60 is received in the receiving recess 421, and surrounds the image sensor 50. In the embodiment, the black glue is applied into the receiving recess 421 and surrounds the image sensor 50. The lower surface 42 of the ceramic substrate 40 is supported on the first surface 21 of the FPCB 20, the second pads 424 are electrically connected to the connecting pads 211 with the conductive film 30. The filter 70 is positioned on the upper surface 41 of the ceramic substrate 40, and the filter 70 closes the transparent hole 411.

The lens holder 80 includes a seat 81 and a receiving portion 82 positioned on one end of the seat 81. The seat 81 is hollow shaped. The receiving portion 82 defines a lens hole 821 communicating with the seat 81. The lens unit 90 is received in the lens hole 821, and includes at least one lens (not shown) and a barrel receiving the at least one lens.

In the process of assembling the camera module 100, the lens holder 80 receiving the lens unit 90 is positioned on the upper surface 41 of the ceramic substrate 40. The seat 81 surrounds the through hole 411. The filter 70 is received in the seat 81. The optical axis of the lens unit 90 is collinear with the optical axis of the image sensor 50.

In use, the image sensor 50 converts the light rays penetrating the lens module 300 to the image signals. The image signals are output to the FPCB 20 orderly through the pins 52, the first pads 423, the second pads 424, and the connecting pads 211. As the stiffening plate 10 is added on the FPCB 20, the mechanical strength of the FPCB 11 and the conductive film 20 are effectively increased, and the ceramic substrate 40 is stably connected to the FPCB 20.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image sensor module, comprising:
a ceramic substrate comprising an upper surface and a lower surface opposite to the upper surface, the ceramic substrate defining a transparent hole on the upper surface and a receiving recess on the lower surface; the transparent hole communicating with the receiving recess;
an image sensor received in the receiving recess and electrically connected to the ceramic substrate;
a conductive film; and
a flexible print circuit board (FPCB) electrically connected to the lower surface of the ceramic substrate with the conductive film; and
a stiffening plate positioned on one side of the FPCB opposite to the ceramic substrate.

2. The image sensor module of claim 1, wherein the receiving recess comprises a connecting surface parallel with the upper surface; the ceramic substrate comprises a plurality of first pads positioned on the connecting surface and a plurality of second pads positioned on the lower surface; the first pads are correspondingly connected to the second pads.

3. The image sensor module of claim 2, wherein the image sensor comprises an image surface and a plurality of pins on the image surface, and the pins are electrically connected to the first pads.

4. The image sensor module of claim 2, wherein the FPCB comprises a first surface and a second surface opposite to the first surface, the FPCB comprises a plurality of connecting pads on the first surface and a grounded pad on the second surface, and the connecting pads are electrically connected to the second pads.

5. An image sensor module, comprising:
a ceramic substrate comprising an upper surface and a lower surface opposite to the upper surface, the ceramic substrate defining a transparent hole on the upper surface and a receiving recess on the lower surface; the transparent hole communicating with the receiving recess;
an image sensor received in the receiving recess and electrically connected to the ceramic substrate;
a conductive film;
a flexible print circuit board (FPCB) electrically connected to the lower surface of the ceramic substrate with the conductive film; and
a stiffening plate positioned on one side of the FPCB opposite to the ceramic substrate;
wherein the receiving recess comprises a connecting surface parallel with the upper surface; the ceramic substrate comprises a plurality of first pads positioned on the connecting surface and a plurality of second pads positioned on the lower surface; the first pads are correspondingly connected to the second pads;
wherein the FPCB comprises a first surface and a second surface opposite to the first surface, the FPCB comprises a plurality of connecting pads on the first surface and a grounded pad on the second surface, and the connecting pads are electrically connected to the second pads;
wherein the stiffening plate is made of conductive material and connected to the grounded pad.

6. A camera module, comprising:
an image sensor module, comprising:
a ceramic substrate comprising an upper surface and a lower surface opposite to the upper surface, the ceramic substrate defining a transparent hole on the upper surface and a receiving recess on the lower surface; the transparent hole communicating with the receiving recess;
an image sensor received in the receiving recess and electrically connected to the ceramic substrate;
a conductive film;
a flexible print circuit board (FPCB) electrically connected to the lower surface of the ceramic substrate with the conductive film; and
a stiffening plate positioned on one side of the FPCB opposite to the ceramic substrate; and
a lens module, comprising:
a lens holder positioned on the upper surface of the ceramic substrate; and
a lens unit receiving the lens holder;
wherein the receiving recess comprises a connecting surface parallel with the upper surface; the ceramic substrate comprises a plurality of first pads positioned on the connecting surface and a plurality of second pads positioned on the lower surface; the first pads are correspondingly connected to the second pads;
wherein the FPCB comprises a first surface and a second surface opposite to the first surface; the FPCB comprises a plurality of connecting pads on the first surface and a grounded ad on the second surface; the connecting pads are electrically connected to the second pads;
wherein the stiffening plate is made of conductive material, and the stiffening plate is connected to the grounded pad.

7. The camera module of claim 6, wherein the image sensor comprises an image surface and a plurality of pins on the image surface, and the pins are electrically connected to the first pads.

* * * * *